US005543617A

United States Patent [19]
Roscoe et al.

[11] Patent Number: 5,543,617
[45] Date of Patent: Aug. 6, 1996

[54] METHOD OF MEASURING FLOW VELOCITIES USING TRACER TECHNIQUES

[75] Inventors: Bradley A. Roscoe; Jeffrey S. Schweitzer, both of Ridgefield; Kenneth E. Stephenson, Newtown, all of Conn.

[73] Assignee: Schlumberger Technology Corporation, New York, N.Y.

[21] Appl. No.: 266,077

[22] Filed: Jun. 27, 1994

[51] Int. Cl.⁶ ................................................. G01V 5/04
[52] U.S. Cl. .......................... 250/259; 250/260; 250/302; 250/303; 250/356.1; 250/356.2
[58] Field of Search .................... 250/303, 302, 250/356.2, 356.1, 260, 259

[56] References Cited

U.S. PATENT DOCUMENTS 4,825,072   4/1989   McWhirter et al. .................. 250/259

FOREIGN PATENT DOCUMENTS 6-138135   5/1994   Japan .................................. 250/356.1

*Primary Examiner*—Constantine Hannaher
*Attorney, Agent, or Firm*—Martin D. Hyden; Leonard W. Pojunas

[57] ABSTRACT

A method of measuring flow velocities in flowing fluids includes injecting into the flow a non-radioactive tracer having a neutron capture cross section higher than that of the flowing fluids, for example a gadolinium compound, and measuring the neutron capture cross section in the fluid downstream of the injection point to detect the passage of the tracer and hence determine the time of flight. By making the tracer miscible with only one phase (typically the continuous phase) of a multi-phase fluid, it is possible to measure the flow velocity of that phase. The neutron capture cross section can be measured by irradiating with neutrons from a pulsed neutron generator and measuring capture γ rays with a scintillation detector.

16 Claims, 2 Drawing Sheets

METHOD OF MEASURING FLOW VELOCITIES USING TRACER TECHNIQUES

FIELD OF THE INVENTION

The present invention relates to a method of measuring flow velocities in flowing fluids using tracers. In particular the invention relates to a method of measuring the flow velocity of a particular phase in a multiphase flow and finds application in measuring flow velocities in hydrocarbon-producing wells.

The fluids produced by a hydrocarbon well typically comprise a hydrocarbon (oil) phase and an aqueous (water) phase and sometimes a gas phase. One of these phases, often the aqueous phase, is continuous and the other phase is dispersed therein. Knowledge of the proportions of these phases and their flow velocities is required to determine the flow rates from the well of the various phases. Many method have been proposed for determining flow velocities in single-phase or multi-phase flows. Some of these require access to the outside of the flow conduit which is not possible in an underground well and so are not applicable to measuring flows within wells as is required for production logging purposes. One particular approach which is applicable to measuring flows in wells is to introduce tracers into the flow and to measure the passage of these tracers past a measurement station to make a measurement of the flow. One example of a tracer technique is the introduction of a saline solution into the flow and the measurement of the change in electrical conductivity as the tracer passes the measurement station. However, problems can arise due to the natural salinity of the fore-ration water and such a technique only measures the aqueous phase and so cannot be used in isolation to provide all of the required measurements in a hydrocarbon well. As an alternative to saline solutions, radioactive tracers have been used to measure single-phase and multi-phase flows. These tracers can be made either oil-soluble or water-soluble and so the technique can be used to measure both phases in a hydrocarbon well. One example of the use of radioactive tracers to determine water flow behind casing (outside the well) is found in U.S. Pat. No. 3,784,828. An example of a tool used to make such measurements of flow inside hydrocarbon wells is the Tracer Ejection Tool of Schlumberger which is described in U.S. Pat. Nos. 4,166,215 and 4,166,216 (both incorporated herein by reference). Minor amounts of suitable radioactive tracer such as iodine 131 are periodically discharged into the continuous-phase well fluid at a selected depth location in the well. Thereafter, by simultaneously measuring the level of radioactivity above and below that location, measurements are obtained which are representative of one or more dynamic flow characteristics of the continuous phase. These measurements are based on the travel time of the tracer from the location where it is discharged into the flow to the measurement stations. Since the ejection of radioactive materials into the fluids that are subsequently produced from the well is often considered undesirable, alternative methods using nuclear radiation techniques have been proposed. These alternative techniques produce short-lived activation components in the flow to provide the radioactive material which is detected, but which is no longer radioactive by the time the fluids are produced from the well. An example of this is found in U.S. Pat. No. 4,233,508 in which the fluid being monitored is irradiated with neutrons such that oxygen atoms are transformed into radioactive nitrogen atoms which decay by emitting γ radiation which is detected at the measurement station. This method of activating a component of the flow only measures the aqueous phase since the oil phase does not include any oxygen atoms which become activated by neutron radiation. Further examples of the use of tracer ejection or activation techniques for measuring flows in wells are disclosed in U.S. Pat. Nos. 5,047,632 and 5,306,911 (both incorporated herein by reference).

It is an object of the invention to provide a method of using nuclear radiation measurements to obtain dynamic flow characteristics which has the advantage of using tracers for measuring aqueous, oil or gas phases while preferably using an electronic radiation source to avoid the need to eject radioactive tracer materials into the well.

It is a further object of the invention to provide a method of measuring phase flow velocity in a well using a non-radioactive tracer.

It is a yet further object of the invention to provide a non-radioactive tracer for use in measuring flow characteristics.

SUMMARY OF THE INVENTION

The present invention provides a method of determining a dynamic flow characteristic of a flowing fluid, for example the flow velocity of one phase in a multi-phase flow, comprising the steps of creating a nuclear radiation environment around a measurement location in the flowing fluid at which radiation is detected; ejecting a tracer into the flowing fluid upstream of the measurement station which affects detection of the radiation at the measurement location as it passes; making a time-based measurement of the radiation at the measurement location to include passage of the tracer so as to determine the effect of the tracer on the detection of radiation; and using the time-based measurement to determine the dynamic flow characteristic. This method has the advantages that the tracer is non-radioactive making handling easier and that no radioactivity resulting from the measurement is produced from the well.

In its most general form, this invention relates to a measurement of a dynamic characteristic of a flow such as material (phase) flow velocity, based on the time T required for the material (phase) to carry a tracer a distance L from an ejection point to a point where the tracer is detected. The velocity of flow is the ratio L/T. The flowing material can be solid (e.g. granular particles), liquid or gas and can comprise all of the flowing material (single phase) or only a part thereof (multi-phase, either as a continuous or dispersed phase). The tracer material can be solid, liquid or gas according to the nature of the material flow to be measured, the only requirement being that the tracer be carried along at substantially the same velocity as the material in the flow. The measurement concept includes an irradiation/detection process in which the irradiation stimulates some physical behavior which is different in the tracer than in the flowing material, and a detector which is responsive to the difference in the physical property between the flowing fluid and the tracer stimulated by the irradiation. Examples of irradiation/detection processes are density and/or photoelectric measurement (irradiated by a γ ray source and detectable by a scintillation detector) and, in the preferred case, thermal neutron capture cross section measurement (activatable by a neutron generator and detectable by either thermal neutron detectors or γ-ray detectors which detects capture γ rays). Other electronic radiation sources such as x-ray tubes might also be used with appropriate detectors.

The particularly preferred embodiment of the present invention is targeted toward the measurement of velocity in oil, water and gas phases in oil wells, and specifically chooses the capture cross section of thermal neutrons produced by moderation in the formation and the borehole of 14 MeV neutrons produced by a DT neutron generator as the tracer physical property which is probed. The detector is preferably a scintillation detector which responds to capture γ rays. Other neutron generators and detectors are possible, e.g. spectroscopic γ ray detectors or γ count rate detectors; the above choices are convenient because they already exist in forms which can be placed in a borehole. As mentioned, the tracer must have a capture cross section which is different from that of the flowing material, which can be a combination of water, oil and gas. Typical components of borehole oil, water and gas have capture cross sections of less than 10 barns, with the exception of chlorine, which has a capture cross section of 33 barns. A preferred tracer for oil and water contains Gd, which has a capture cross section of 49000 barns, in its isotopically natural form. A tracer for gas is $BF_3$, where the B, which has a capture cross section of 760 barns, in its isotopically natural form provides the high neutron capture cross section of the tracer.

Where the method concerns making measurements in wells (or boreholes), the step of creating a radioactive environment can comprise irradiating the underground formation surrounding the well with neutrons so as to create a high neutron population within the well which is detected, for example using a thermal neutron detector, at the measurement location. In this case, irradiation can be achieved using a pulsed accelerator neutron source such as, for example, a 14 MeV D-T accelerator. Other electronic radiation sources such as x-ray tubes might also be used where appropriate. In a particularly preferred embodiment, γ rays which result when the tracer interacts with the neutrons are detected at the measurement location.

The tracer need not be radioactive and in the preferred case is non-radioactive. In a particularly preferred embodiment, the tracer comprises a compound which has a high neutron capture cross section such as a gadolinium-containing compound.

The present invention also provides an apparatus for use in determining a dynamic flow characteristic of a flowing fluid, for example the flow velocity of one phase in a multi-phase flow, comprising a tool body which can be positioned in or around the flowing fluid and including a radiation detector situated at a measurement location in the tool body; means for creating a radiation environment around the measurement location in the flowing fluid at which radiation is detected, for example a neutron source; means in the tool body for ejecting a tracer into the flowing fluid upstream of the measurement station; means for making a time-based measurement of the radiation detected by the radiation detector at the measurement location to include passage of the tracer so as to determine the effect of the tracer on the detection of radiation.

The present invention also provides a tracer for use in determining flow characteristics of a fluid comprising a compound which is miscible with the fluid and which includes a non-radioactive material having a physical behavior in a radiation environment which is substantially different to that of the fluid, such as a high neutron capture cross section, a higher density or a high Z (effective atomic number).

Where the fluid under investigation comprises one phase of a multi-phase flow, the compound is miscible with that phase, soluble in the phase or capable of flowing with that phase. Also, the density of the tracer should be selected such that it does not affect the flow of the phase under investigation. It will be appreciated that a tracer can be used which increases the density of the phase under investigation and this can be measured to detect passage of the tracer.

DETAILED DESCRIPTION OF THE PREFERRED EMBODIMENT

Figure 1:
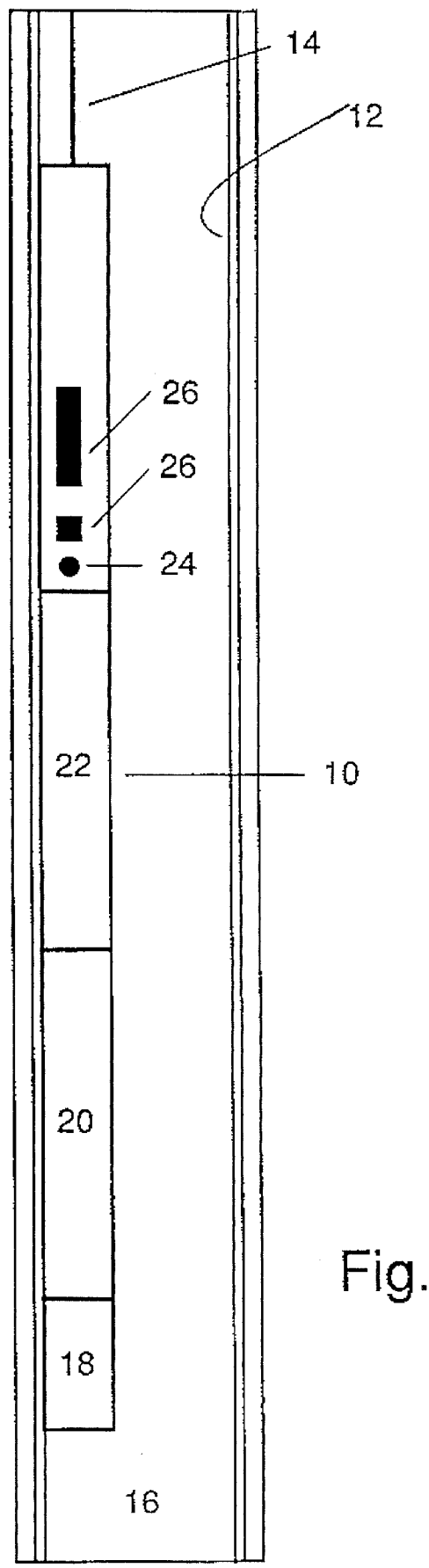
FIG. 1 shows a schematic view of a tool according to one embodiment of the invention.

Referring now to FIG. 1, the embodiment of the present invention shown therein comprises a wireline tool 10 which is suspended inside a cased well 12 by means of a wireline cable 14. The well is filled with fluid 16 comprising a mixture of formation water (brine) and oil which flows in the direction of the arrow. In some cases the fluid can also include gas. The tool 10 includes a tracer ejection section 18 at its downstream end, a spacer section 20 (optional), an accelerator controller section 22, a pulsed DT accelerator neutron source 24 such as that described in U.S. Pat. No. 4,721,853 (incorporated herein by reference) and γ ray detectors 26 of the type generally used for borehole tools. In use, the source 24 is used to irradiate the formation surrounding the well with 14 MeV neutrons which are moderated by interaction with the surrounding material down to thermal energies. The moderation and capture of the neutron produces γ rays which are detected at the detectors 26. The ejector section 18 is substantially the same as the ejector section described in U.S. Pat. Nos. 4,166,215 and 4,166,216 and serves to eject a quantity of tracer into the flow. The concentration of the tracer and the amount ejected can be selected so as to give easily detectable results as will be explained later. The tracer can either be a water-soluble compound, for example an aqueous solution of gadolinium chloride $GdCl_3$, or an oil-soluble compound. Suitable oil miscible preparations include brine in oil emulsions and Gd tagged organic compounds which can also be oil-soluble. Brine in oil emulsions can be prepared using mineral oil, $GdCl_3$ brines, and a surfactant such as EMUL-HT. A suitable oil-soluble tracer has the general formula $Gd(RCOO)_3$ wherein R is typically $CH_3(CH_2)_4$. An alternative version of the tracer includes six additional $CH_2$ groups. The general preparation scheme is as follows:

$$Gd(X)_3 + RCOOH \rightarrow Gd(RCOO)_3 + H_2O + HX$$

X being chloride or acetate.

The water and acid produced in the reaction by azeotroping with toluene, the toluene serving to dissolve the tracer compound and make it oil-miscible. The reaction is preferably conducted at not more than 116° C. with an excess of organic reagent of about 10%. The resulting compound, after removal of water and acid, is dissolved in toluene to give a Gd content of about 15%. This can then be further diluted with heptane for use in the method as described herein.

To be useful in the present invention, the tracer must be carried along at the same velocity as the phase of interest, which means that the tracer must mix preferentially with the phase of interest. For gases, this is not a problem, especially in stratified flows in horizontal wells, since ejected gas, such as $BF_3$, will rise to the top of the liquid and mix with the flowing gas. For oil and water, the Gd must be prepared in an oil or water miscible form, respectively. In a horizontal well, the water miscible Gd preparation should be more dense than the oil phase, and the oil miscible Gd preparation should be less dense than the water phase. This will ensure that, irrespective of the phase into which the tracer is actually injected (i.e. surrounding the ejector section 18 at the time of injection), it will move under buoyant forces to the correct phase.

Figure 2:
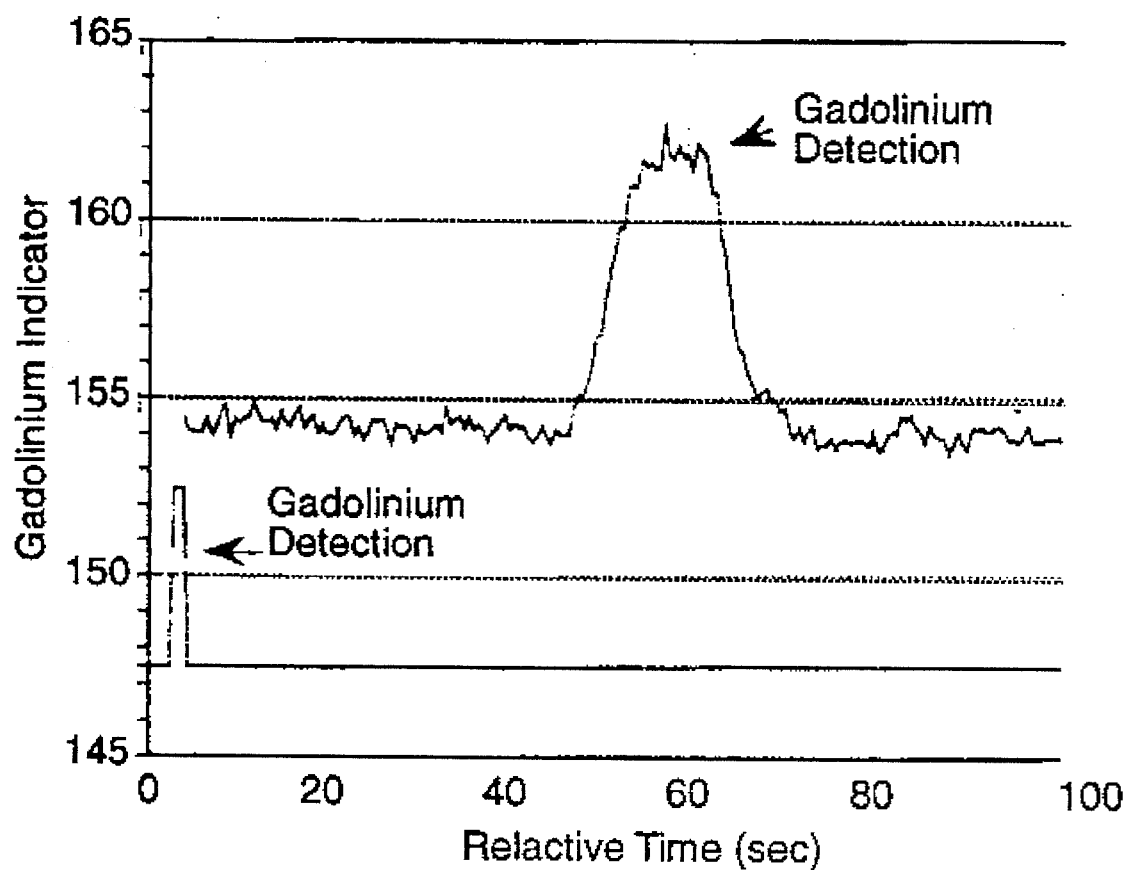
FIG. 2 shows a time based plot of apparent borehole thermal neutron cross-section when using the tool of FIG. 1 to measure flow velocity.

The output of the detectors is monitored after the time that the tracer is ejected. As the tracer enters the region of the source 24 and detector 26, which is high in thermal neutrons, the γ ray count at the detectors 26 will be affected. Because of the high capture cross section of the gadolinium, the rate of decay of thermal neutrons will be increased while the tracer is in the region of the source. This rate of decay is detectable using the techniques utilized in thermal decay neutron logging of underground formations with pulsed neutron sources. By knowing the time of ejection of the tracer and the time of the appearance of the peak in the neutron decay rate, the time of flight of the tracer can be determined and hence the velocity of the respective flow. This is preferably done in the manner described in U.S. Pat. Nos. 4,166,215 and 4,166,216, i.e. in the same manner as is used to determine flow velocity using radioactive tracers. FIG. 2 shows a time based plot of neutron decay (apparent borehole thermal neutron cross section) after ejection of the Gd tracer (also shown on the plot). With a tracer ejection at about 5 seconds on the scale, a peak mid-point of about 55 seconds on the same scale and an ejector-to-detector spacing in the range 10–20 ft, the flow velocity is about 0.2–0.4 ft/sec. For a measurement such as this, the neutron source is preferably operated so as to provide a series of neutron busts of about 20 µs separated by gaps of about 80 µs. The detectors can be gated over the 100 µs period to distinguish between the various origins of the γ rays detected (inelastic scatter, capture etc.).

An alternative to the measurement of the thermal neutron decay rate is the spectroscopic detection and measurement of the characteristic γ rays given off due to neutron capture in Gd. The count rate of Gd neutron capture γ rays will increase as the tracer passes the measurement location.

We claim:

1. A method of determining dynamic flow characteristics of flowing multi-phase fluid comprising an aqueous phase and a hydrocarbon phase, one of which is continuous and the other of which is dispersed, in an underground hydrocarbon well, the method comprising:

(a) creating a radiation environment around a measurement location in the flowing multi-phase fluid at which radiation is detected;

(b) ejecting a tracer into one phase of the flowing multi-phase fluid upstream of the measurement station which affects detection of the radiation at the measurement location as it passes;

(c) making a time-based measurement of the radiation at the measurement location to include passage of the tracer in said one phase so as to determine the effect of the tracer on the detection of radiation;

(d) determining the flow velocity of said one phase from the time-based measurement; and (e) using the flow velocity of said one phase to determine the dynamic flow characteristic.

2. A method as claimed in claim 1, wherein the step of making a time based measurement comprises measuring the time required for the flowing fluid to carry the tracer from an ejection point to a measurement location where the tracer is detected.

3. A method as claimed in claim 1, wherein said one phase comprises the continuous phase.

4. A method as claimed in claim 1, wherein the step of creating a radiation environment comprises irradiation with a neutron source.

5. A method as claimed in claim 4, wherein the step of making a time based measurement comprises measuring the rate of thermal neutron decay.

6. A method as claimed in claim 4, wherein the step of making a time based measurement comprises measuring the count rate of γ rays arising from thermal neutron capture.

7. A method as claimed in claim 1, wherein said one phase is a dispersed phase.

8. Apparatus for determining dynamic flow characteristics of flowing multi-phase fluid comprising an aqueous phase and a hydrocarbon phase, one of which is continuous and the other of which is dispersed, in an underground hydrocarbon well, the apparatus comprising:

(a) a tool body which is positioned in the flowing multi-phase fluid and includes a measurement station having a radiation detector;

(b) means for creating a radiation environment in the flowing multi-phase fluid around the measurement station;

(c) a tracer ejector in the tool body for ejecting a tracer into one phase of the flowing multi-phase fluid upstream of the measurement station which affects detection of the radiation at the measurement station as it passes;

(d) means for making a time-based measurement of the radiation at the measurement station to include passage of the tracer in said one phase so as to determine the effect of the tracer on the detection of radiation;

(e) means for determining the flow velocity of said one phase from the time-based measurement; and (e) means for using the flow velocity of said one phase to determine the dynamic flow characteristic.

9. Apparatus as claimed in claim 8, wherein the means for creating a radiation environment around the measurement location comprises means for irradiating with neutrons.

10. Apparatus as claimed in claim 9, wherein the means for irradiating with neutrons comprises an accelerator neutron source.

11. Apparatus as claimed in claim 10, further comprising means for measuring thermal neutron capture cross section.

12. Apparatus as claimed in claim 9, wherein the means for making a time-based measurement of the radiation includes a thermal neutron detector.

13. Apparatus as claimed in claim 9, wherein the means for making a time-based measurement of the radiation includes a γ ray detector.

14. Apparatus as claimed in claim 8, comprising a logging tool which can be positioned in an underground borehole.

15. Apparatus as claimed in claim 8, wherein the tracer ejector comprises means for ejecting a tracer into an aqueous phase of the flowing multi-phase fluid.

16. Apparatus as claimed in claim 8, wherein the tracer ejector comprises means for ejecting a tracer into a hydrocarbon phase of the flowing multi-phase fluid.

* * * * *